Jan. 15, 1924. Re. 15,745

A. M. HUDSON

WHEEL FENDER

Original Filed Jan. 29, 1919

INVENTOR
Alexander M. Hudson
BY Kenyon & Kenyon
ATTORNEYS

Reissued Jan. 15, 1924. Re. 15,745

UNITED STATES PATENT OFFICE.

ALEXANDER M. HUDSON, OF NEW YORK, N. Y.

WHEEL FENDER.

Original application filed January 29, 1919, Serial No. 273,703. Renewed March 16, 1921, Serial No. 452,722. Original No. 1,393,020, dated October 11, 1921. Application for reissue filed September 21, 1923. Serial No. 664,139.

*To all whom it may concern:*

Be it known that I, ALEXANDER M. HUDSON, a citizen of the United States, residing at New York, in the county of New York and State of New York, have invented certain new and useful Improvements in Wheel Fenders, of which the following is a specification.

This invention relates to wheel fenders, such as are applied to automobiles, and it belongs in that class of fenders comprising springs extending transversely across the front of the vehicle, and arranged as a protection to the lamps and radiator, while also extending at the sides or ends to protect the wheels or to prevent persons from falling against the wheels when hit by the fender.

The object of this invention is the production of a wheel fender of the character stated comprising parts of special construction and arrangement with reference to each other, whereby it is believed that the elastic effect of all the various springs or parts thereof is fully called into play when the fender encounters an obstacle, and the springs will not be permanently distorted by such collision but will recover their original shapes and positions.

Figure 1:
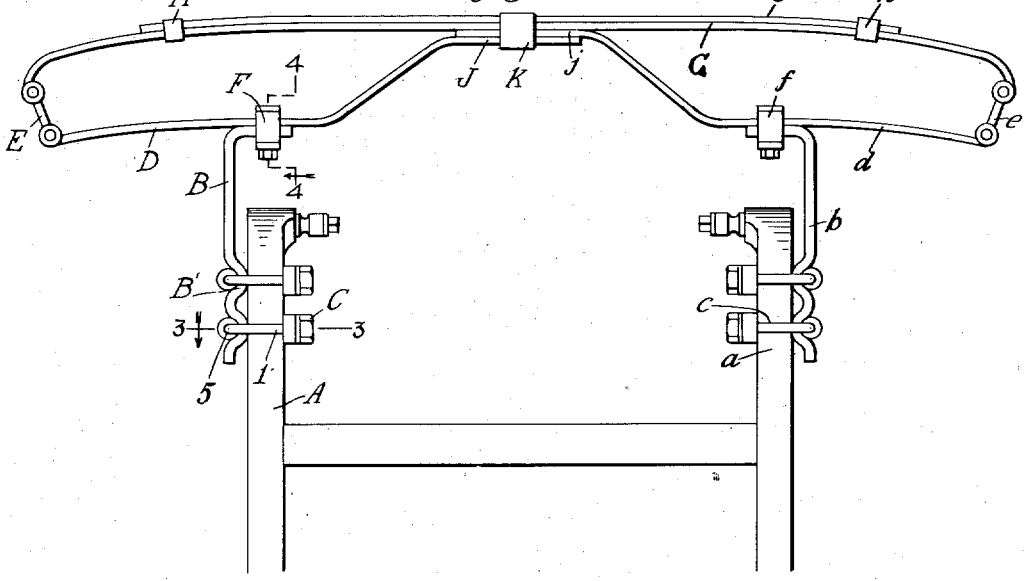
Figure 2:
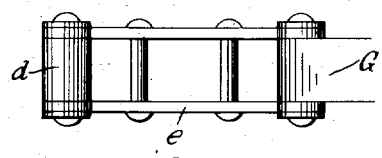
Figure 3:
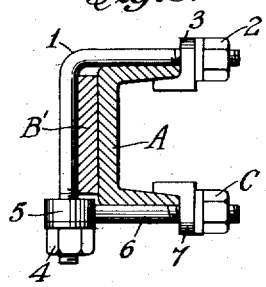
Figure 4:
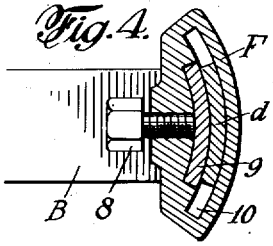
Figure 5:
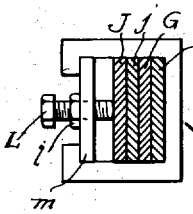

The special construction and arrangement of the parts of this invention are set forth in the accompanying drawings, of which Figure 1 is a top plan view of the front portion of an automobile frame with a fender constructed in accordance with this invention applied thereto. Fig. 2 is a side view, slightly enlarged showing the spacing shackle that pivotally connects the outer ends of the front buffer spring and the rear or auxiliary spring. Fig. 3 is a cross-section of one of the side pieces of an automobile frame illustrating the clamp or fixture for securing the fender bracket in position. Fig. 4 is a cross-section of the slotted block connecting the rear springs of the fender and the end of the supporting bracket and shows the curved construction of the parts whereby the fender may be adjusted in a higher or lower position. In Figs. 3 and 4 the scale of drawing is increased, and the sections are taken upon the broken lines 3—3 and 4—4 of Fig. 1. Fig. 5 is a cross-section of the connector K adjustably connecting the main buffer spring and the reenforcing and rear springs as hereinafter described.

Throughout the drawings and description the same letter is used to refer to the same part.

Considering Figs. 1, 2, 3 and 4 of the drawings, the side pieces A and *a* of the frame of an automobile, have attached thereto the fender-supporting brackets B and *b*. It will be noted that the brackets have the curved portions B′ arranged with their convex sides against the side piece of the frame. The brackets are secured to the frame by means of the clamping fixtures designated generally by the letters C and *c*. Each of these clamping devices has an L-bolt 1, provided with a nut 2 on the upper end of its horizontal portion or leg, and the purpose of the nut 2 is to hold the catch block 3 in engagement with the edge of the U-shaped side piece A of the automobile frame. The clamping fixture C is best illustrated in Fig. 3. The vertical leg of the L-bolt 1 has a nut 4 on its lower end, which secures the eye 5 of the eye-bolt 6 upon the vertical leg of the L-bolt 1. It will be observed in Fig. 1 that the L-bolts engage the concave sides of the grooved parts B′ of the brackets supporting the fender. The eye-bolt 6 passes beneath the side piece A of the automobile frame, and it is provided with a nut on its extremity the purpose of which is to hold the catch block 7 in engagement with the edge of the side piece A as shown. The object of the construction explained for the clamping fixture C, is to provide for slight differences in width or height of the side pieces of the frames of different kinds of automobiles. The L-bolt is adjustable for the width at the top and for the height, and the eye-bolt 6 is adjustable for width at the bottom.

The fender portion of this invention comprises the rear or auxiliary springs D and *d*, which have the shackles E and *e* pivotally connected with their ends and which will be again mentioned. The rear springs D and *d* are secured to the brackets B and *b* by extending the bent ends of the brackets through slotted clamping blocks F and *f*. In Fig. 4 the block F is shown in section. It will be observed that the end of the bracket B, and the rear spring d rest one against the other, and that the end 5 of the bracket is located in a recess in the slot 10, while the rear spring may be moved up or down in the slot, when the set screw 8 is loosened. The end of the bracket, and the rear spring as well as the slot 10 are formed with surfaces which may be described as portions of cylinders having the same central axis. Thus, if the set screw 8 be loosened the rear spring *d* of the fender may be raised or lowered correspondingly adjusting the fender as a whole.

The remaining members of the fender structure are the front buffer spring G to the ends of which the shackles E and *e* are pivotally connected, and the reinforcing spring *g*, coupled at the ends to the main spring by the clamps H and *h*. At the middle point the main and the cap or reinforcing spring *g* are joined by a connector K, and the ends J and *j* of the rear springs D and *d* pass movably through the connector K. It will be understood that the connector K which, as stated, joins the main buffer spring G and the outer or reinforcing spring *g*, is secured to those springs at their middle points in any common way. This may be done by brazing or by electric welding, but I prefer to use an adjustable clamp or sleeve of any suitable form, which, after being placed around the springs, is tightened to the needed degree by means of a nut and bolt forming part of the clamp. Such clamp is illustrated by K in Fig. 5. It is provided with tapped plate *m*, lag bolt L and lock nut *l*, the bolt operating through said plate to hold the members J, *j*, G, *g* under the tension desired. This will provide a frictional hold sufficient for the purpose, and at the same time permit independent movement of the springs with respect to each other. The connector K is an essential part of my invention only when the rear spring is made in two parts. It is not intended to limit this invention to constructing the rear springs in two parts with the overlapping ends as shown in Fig. 1, as the springs may be made in one continuous piece. Nor is the reinforcing spring *g* a necessary part of my invention. It will be further understood that the special form of shackle set out in Fig. 2 may be departed from within the purview of this invention.

In the operation of this invention, it will be noted that the shackles E and *e* permit the ends of the main and rear springs to move independently as to direction wherever the end portions of the fender encounter an obstacle, and it is also believed to be clear from the drawings and the foregoing description that the full elastic capability of the end portions of both main and rear springs is brought into play. Neither of the springs is twisted or distorted. Furthermore, if the main spring is struck in the middle it is bent backwardly at that point, and receives the assistance of both portions of the rear springs D and *d* lying between the brackets, to the full elastic limit of those portions. The ends J and *j* of the rear springs, which overlap as explained and illustrated, slide upon each other and within the connector K, and a blow upon the middle of the fender, if the fender is constructed in accordance with this invention, will not tend to spread the side pieces A and *a* of the automobile frame apart. In any event, whether struck in the middle or at the ends, the full elasticity of all the springs concerned is brought into play.

Having now described this invention, and explained the mode of its operation, what I claim is:

1. In a wheel fender, the combination with fender supports, of a main buffer front spring, a rear auxiliary spring, shackles pivotally connecting the outer ends of the main and rear springs and spacing the said ends apart, the said rear spring being bent forward in the middle and arranged in contact with the said front spring, and means for connecting the middle portion of the said front spring with the said rear spring.

2. In a wheel fender, the combination with fender supports, of a main front buffer spring, a rear auxiliary spring including two portions, the said portions of the rear spring being connected with the said supports and projecting outwardly beyond said supports and inwardly between the said supports and extending forwardly toward the said main spring and having extremities overlapping in the middle, the said overlapping extremities of the portions of the rear spring being arranged against the middle of the main spring, means connected with the said main spring and constructed to hold the overlapping extremities of the rear spring in position, and shackles pivotally connecting the outer ends of the said main and rear springs and spacing the said ends apart.

3. In a wheel fender, a fender support comprising an arm provided with a plurality of projecting curved portions, a side piece of an automobile frame having a flat side, the convex sides of the said curved portions of the said arm being arranged against the flat side of the said side piece of the frame, and means engaging the concave sides of the said curved portions of the arm for clamping the arm and side piece together.

4. A fender support, comprising an arm, a block carried by the said arm, the said block having a curved opening, a fender having a portion arranged movably in said opening of the block and correspondingly curved whereby the fender may be adjusted higher or lower in the said opening of the block, and means for clamping the fender in the block.

5. A fender support clamping fixture, comprising in combination a U-shaped side piece of an automobile frame, an L-bolt arranged upon the top and along the vertical side of the said side piece, a catch block engaging the L-bolt and an edge of the said side piece, a nut on the L-bolt for securing the said catch block, an eye-bolt arranged against the bottom of the side piece and having an eye engaging the said L-bolt, means for retaining the eye upon the L-bolt, a second catch block engaging the said eye-bolt and an edge of the said side piece, and a nut on the eye-bolt for securing the second catch block.

6. In a wheel fender, the combination with fender supports, of a main buffer front spring, a rear auxiliary spring, shackles pivotally connecting the outer ends of the main and rear springs and spacing the said ends apart.

7. In a wheel fender, the combination with fender supports, of a main buffer front spring, a rear auxiliary spring, shackles pivotally connecting the outer ends of the main and rear springs and spacing the said ends apart, the said rear spring being bent forward in the middle.

8. In a wheel fender, the combination with fender supports, of a main buffer front spring, a rear auxiliary spring, shackles pivotally connecting the outer ends of the main and rear springs and spacing the said ends apart, the said rear spring being bent forward in the middle and arranged in contact with the said front spring.

9. In a wheel fender, the combination with fender supports, of a main front buffer spring, a rear auxiliary spring including two portions, the said portions of the rear spring being connected with the said supports, and having extremities which overlap, and means for holding the overlapping extremities of the rear spring in position against the main spring, and shackles pivotally connecting the outer ends of the said main and rear springs, and spacing the said ends apart.

10. In a wheel fender, the combination with fender supports, of a main front buffer spring, a rear auxiliary spring including two portions, the said portions of the rear spring being connected with the said supports and extending forwardly toward the said main spring, and having extremities which overlap, and means for movably holding the overlapping extremities of the rear spring in position against the main spring, and shackles pivotally connecting the outer ends of the said main and rear springs and spacing the said ends apart.

11. In a wheel fender, the combination with fender supports, of a main front buffer spring, a rear auxiliary spring including two portions, the said portions of the rear spring being connected with the said supports and having extremities which overlap, and means for holding the main spring and the overlapping extremities of the rear spring in contact with each other, and shackles pivotally connecting the outer ends of the said main and rear springs and spacing the said ends apart.

ALEXANDER M. HUDSON.